United States Patent
Fujioka et al.

(10) Patent No.: US 7,619,693 B2
(45) Date of Patent: Nov. 17, 2009

(54) LIQUID CRYSTAL DISPLAY DEVICE

(75) Inventors: Takahiro Fujioka, Mobara (JP); Koji Hiraga, Ooamishirasato (JP); Takehiko Kubota, Matsumoto (JP)

(73) Assignee: Hitachi Displays, Ltd., Chiba (JP)

( * ) Notice: Subject to any disclaimer, the term of this patent is extended or adjusted under 35 U.S.C. 154(b) by 311 days.

(21) Appl. No.: 11/003,535

(22) Filed: Dec. 6, 2004

(65) Prior Publication Data

US 2005/0140891 A1 Jun. 30, 2005

(30) Foreign Application Priority Data

Dec. 26, 2003 (JP) ............................ 2003-432389

(51) Int. Cl.
*G02F 1/1343* (2006.01)
(52) U.S. Cl. ...................................... 349/38
(58) Field of Classification Search ............ None
See application file for complete search history.

(56) References Cited

U.S. PATENT DOCUMENTS

| 6,424,328 | B1 | 7/2002 | Ino et al. | |
|---|---|---|---|---|
| 6,587,162 | B1 * | 7/2003 | Kaneko et al. | 349/43 |
| 6,674,499 | B2 | 1/2004 | Nakamura | |
| 6,855,955 | B2 * | 2/2005 | Jeon et al. | 257/59 |
| 2004/0085503 | A1 * | 5/2004 | Kim et al. | 349/141 |

FOREIGN PATENT DOCUMENTS

| JP | 11-327518 | 8/1998 |
|---|---|---|
| JP | 2002-151699 | 11/2000 |

* cited by examiner

*Primary Examiner*—Timothy Rude
(74) *Attorney, Agent, or Firm*—Stites & Harbison PLLC; Juan Carlos A. Marquez, Esq.

(57) ABSTRACT

The present invention provides a liquid crystal display device which can obtain a high image quality display by suppressing the fluctuation of a pixel voltage. Along a large number of drain lines which are driven in a time-division manner, a portion of gate line is extended and an additional capacitance is formed by an extending portion of the gate line which has fixed potential and the drain line.

8 Claims, 10 Drawing Sheets

LIQUID CRYSTAL DISPLAY DEVICE

The present application claims priority from Japanese application JP2003-432389 filed on Dec. 26, 2003, the content of which is hereby incorporated by reference into this application.

BACKGROUND OF THE INVENTION

The present invention relates to an active matrix type display device, and more particularly is suitably applicable to a liquid crystal display device which performs time-division driving of drain lines.

As a display device which is capable of performing a high-definition color display for a mobile phone, a notebook type computer, a display monitor or the like, various types of flat panel type display devices including a liquid crystal display device which uses a liquid crystal panel, an organic electroluminescence display device (organic EL display device) which uses electroluminescence (particularly organic electroluminescence) element, a field emission type display device (FED) which uses field emission element and the like have been already put into practice or have been studied for future practice.

This type of display device includes a substrate provided with pixels which form an image display region. For example, in one example of the liquid crystal display device which is popularly used as display means, on a main surface of a first substrate which is preferably made of glass and is also referred to as a thin film transistor substrate (TFT substrate), a plurality of pixels having thin film transistors are arranged in a matrix array where the pixels are arranged two-dimensionally in the horizontal direction and the vertical direction, the first substrate and a second substrate (also referred to as a counter substrate) having color filters corresponding to respective pixels are laminated to each other, and liquid crystal is sealed in a lamination gap thus forming the liquid crystal display device. Here, the color filters may be formed on the first substrate side. The liquid crystal display device in which a common electrode (also referred to as a counter electrode) is formed on the second substrate side and the pixels are driven in response to electric fields generated between both substrates is referred to as a vertical field type (TN type) display device.

Here, driving circuits are arranged outside the display region of the first substrate. The driving circuits include a gate line scanning circuit (also referred to as a gate driving circuit) which applies a scanning signal (selection signal) to gates of thin film transistors which constitute pixel circuits of the pixels which are arranged on the display region in a matrix array, and a video signal line output circuit (also referred to as a drain driving circuit) which supplies a video signal to drain electrodes of the thin film transistors which are selected by the gate line scanning circuit.

As other type of pixel driving method of the liquid crystal display device, there has been known a lateral electric field (IPS: In-Plane-Switching) method. This method is a method in which both of pixel electrodes and a common electrode are formed on a first substrate side and liquid crystal is driven based on electric fields generated between the pixel electrodes and the common electrode.

Particularly, in the IPS-method liquid crystal display device, to enhance the transmissivity, the common line adopts a transparent wiring layer (a layer made of ITO or the like) having a relatively high resistance as a wiring layer different from the gate lines and storage lines, and the common line is overlapped with the gate lines and the storage lines. Further, the capacitance between the drain line and other fixed potential is not provided intentionally and hence, is relatively small.

As the driving circuit of the liquid crystal display device, the respective drain lines are usually driven altogether. However, there exists the driving circuit in which to reduce the number of output terminals of the drain driver IC, a time-division switch is formed on the first substrate and the drain lines are driven in a time-division manner. In this case, there exists a period in which the drain line assumes a floating state.

As documents which disclose this type of liquid crystal display device, for example, Japanese Unexamined Patent Publication 2002-151699 (patent document 1) and Japanese Unexamined Patent Publication Hei 11(1999)-327518 (patent document 2) can be named. The patent document 1 discloses a liquid crystal display device in which extension portions of capacitance lines have a width greater than a width of signal lines and, at the same time, a light shielding function is provided with respect to a region defined in a gap of each pixel electrode. Here, in the patent document 1, the time-division driving of the drain lines is not performed. Further, patent document 2 discloses a liquid crystal display device which performs the time-division driving using the dot inversion.

SUMMARY OF THE INVENTION

In the time-division-driving, two or more drain lines are formed into one set, and a voltage is written in the respective drain lines by performing the time division of one horizontal period of one output from the drain driver IC chip and hence, there exists a period in which the drain line assumes an electrically floating state in the midst of one horizontal period. A common line layer (common layer) which is formed of an ITO layer has the high resistance and hence, there may be a case that a target common line voltage is not obtained at a remote end of the common line before the drain line assumes the floating state. Here, during a period in which the gate line assumes an ON level and the drain line assumes a floating state, when the common line (or common electrode) voltage is changed, the voltage of the drain line or the voltage of the pixel electrode is changed due to the capacitive coupling. Accordingly, when the common line voltage is changed during the period that the gate line assumes an OFF level, the pixel voltage and the drain line voltage are changed due to the capacitive coupling and hence, the pixel voltage is displaced from the target voltage thus giving rise to the lowering the display quality. The similar phenomenon may occur when the storage line is changed. Accordingly, it is possible to obtain the display of high quality by suppressing the change of the pixel voltage.

To enumerate examples of typical constitutions of the present invention, they are as follows.

(1) A liquid crystal display device includes a pair of substrates which sandwich liquid crystal therebetween, a plurality of gate lines which extend in one direction and are arranged in parallel in another direction which intersects one direction, a plurality of drain lines which extend in another direction and are arranged in parallel in one direction, a plurality of storage lines which extend in one direction and are arranged in parallel in another direction, and a plurality of pixels which are arranged in a matrix array corresponding to intersecting portions of the gate lines and the drain lines, wherein the pixel includes a thin film transistor which is driven by the gate line, a common electrode which is driven based on a voltage between at least two common voltages, a pixel electrode to which the voltage of the drain line is applied by way of the thin film transistor and drives the liquid crystal with the potential difference between the common electrode and the pixel electrode, and a storage capacitance which allows one electrode to have a potential of the pixel electrode and another electrode to have a potential of the storage line, the drain lines are driven in the time-division manner using two or more drain lines as a set, and the drain lines include additional capacitance which is added between the drain line and a fixed potential which is fixed during a period that at least the thin film transistor is turned on at portions other than intersecting portions between the drain lines and the gate lines and intersecting portions between the drain lines and the storage lines.

(2) In the above-mentioned constitution (1), the additional capacitance is formed between the drain line and the gate line.

(3) In the above-mentioned constitution (1) or (2), the additional capacitance is formed between the drain line and the storage line.

(4) In any one of the above-mentioned constitutions (1) to (3), out of the pair of substrates, one substrate includes the drain lines and another substrate includes the common electrode.

(5) In any one of the above-mentioned constitutions (1) to (3), out of the pair of substrates, one substrate includes the drain lines and the common electrode.

(6) In any one of the above-mentioned constitutions (1) to (3), the liquid crystal display device includes a plurality of common lines which extend in one direction and are arranged in parallel in another direction, and the common electrode is independently driven for every one line by the common line.

(7) In any one of the above-mentioned constitutions (1) to (3), the common electrodes are driven in common with the respective pixels.

(8) In any one of the above-mentioned constitutions (1) to (3), the common electrodes are driven for the respective pixels independently.

(9) In any one of the above-mentioned constitutions (1) to (3), the potential of the storage lines is fixed.

(10) In any one of the above-mentioned constitutions (1) to (3), the potential of the storage lines is driven between at least two storage voltages.

Here, as a method for forming the additional capacitance, (a) a method which allows the drain lines to be branched (or extended) to be overlapped to the gate lines, (b) a method which allows the gate lines to be branched (or extended) to be overlapped to the drain lines, (c) a method which allows the drain lines to be branched (or extended) to be overlapped to the storage lines, (d) a method which allows the storage lines to be branched (or extended) to be overlapped to the drain lines or the like is considered.

By additionally providing the capacitance between the drain lines and other fixed potentials, it is possible to reduce the voltage fluctuation of the pixel electrodes and the voltage fluctuation of the drain lines generated by the capacitive coupling of the common electrodes or the common lines. Further, the pixel voltage difference between the near end portions and the remote end portions of the common lines can be reduced. As a result, it is possible to obtain the image display having the stabilized high quality.

Here, the present invention is not limited to the above-mentioned constitution and the constitutions of embodiments described later and various modifications can be made without departing from the technical concept of the present invention. Further, the present invention is not limited to an IPS type liquid crystal display device and is also applicable to a TN type liquid crystal display device in the same manner.

DESCRIPTION OF THE PREFERRED EMBODIMENTS

Embodiments of a liquid crystal display device according to the present invention are explained in detail in conjunction with drawings which show the embodiments.

Embodiment 1

Figure 1:
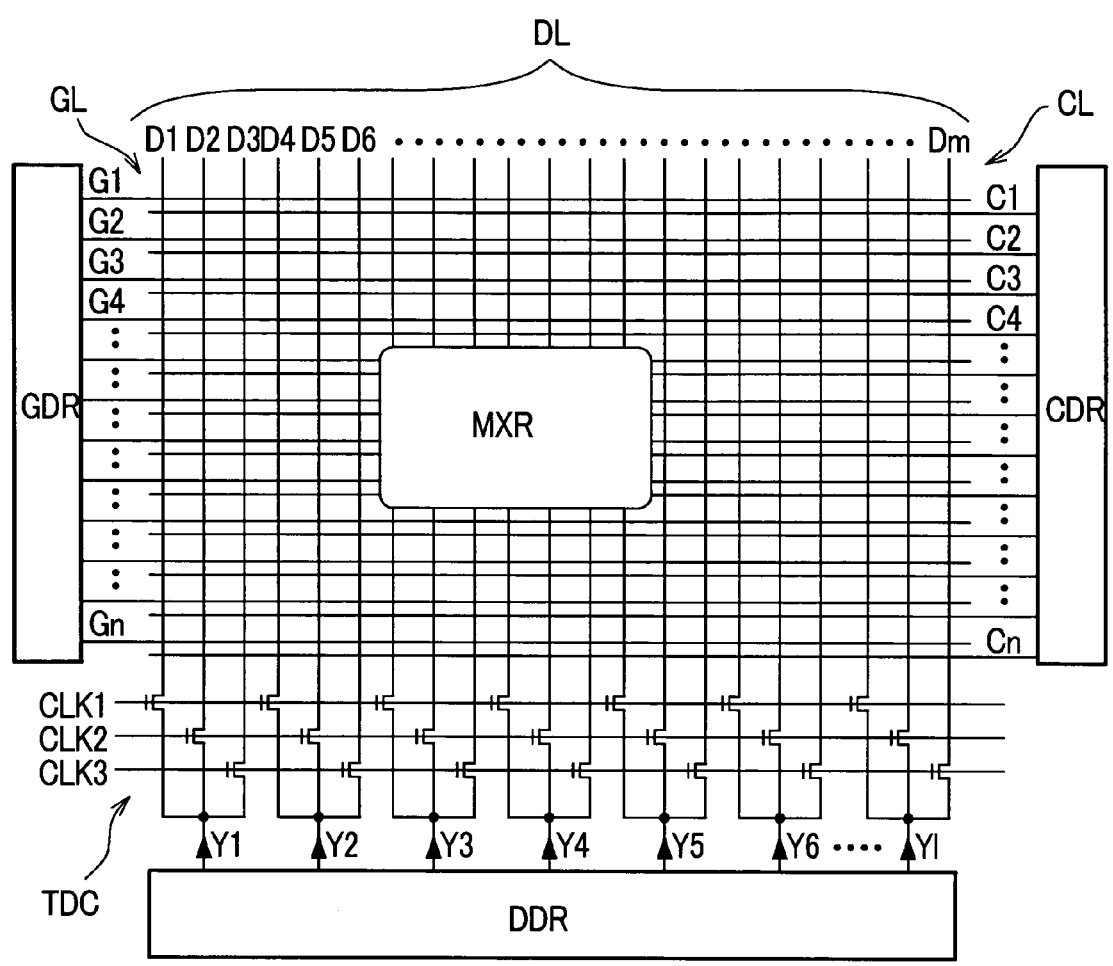
FIG. 1 is an explanatory view showing a constitutional example of a liquid crystal display device of the present invention which performs the time-division driving.

FIG. 1 is an explanatory view showing a constitutional example of a liquid crystal display device of the present invention which performs the time-division driving. In FIG. 1, on a pixel matrix portion, that is, on a display region MXR, gate lines GL (G1, G2, . . . Gn) and drain lines DL (D1, D2, . . . Dm) are arranged in an intersecting manner. The plurality of gate lines GL extend in one direction (the lateral direction in FIG. 1) and are arranged in parallel in another direction (the longitudinal direction in FIG. 1) which intersects one direction. The plurality of drain lines DL extend in the above-mentioned another direction and are arranged in parallel in the above-mentioned one direction. Corresponding to intersecting portions of the gate lines GL and the drain lines DL, a plurality of pixels are arranged in a matrix array thus forming the above-mentioned display region MXR. Each pixel includes a thin film transistor (TFT), wherein a gate of the thin film transistor of the pixel is connected with the gate line GL and is driven in response to a scanning signal.

Further, drains of the thin film transistors of the pixel are connected with the drain line DL. Then, each pixel includes a pixel electrode which is connected with a source of the thin film transistor, wherein during a period in which the thin film transistor is turned on in response to a scanning signal, a voltage of the drain line DL (a video signal) is applied to the pixel electrode through the thin film transistor. Further, each pixel includes a common electrode and the liquid crystal is driven due to the potential difference between the pixel electrode and the common electrode.

Although the constitution of common electrodes and the constitution which supplies the voltage to the common electrodes have various modes, in this embodiment, as one example of the constitution, there is shown an example in which, as an example, the common electrodes are independently driven for every one line in response to the common lines CL. The common lines CL (C1, C2, ... Cn) extend in the above-mentioned one direction and are arranged in parallel in the above-mentioned another direction.

Further, although not shown in FIG. 1, the liquid crystal display device of this embodiment includes a plurality of storage lines which extend in the above-mentioned one direction and are arranged in parallel in the above-mentioned another direction. Then, each pixel includes the storage capacitance in which one electrode of the storage capacitance assumes the potential of the pixel electrode and another electrode of the storage capacitance assumes the potential of the storage line. Due to such a constitution, it is possible to hold the video signal written in the pixel for a relatively long time.

In a periphery of the display region MXR, a gate line scanning circuit GDR which applies the scanning signal to the gate lines GL and a video signal line output circuit DDR which supplies the video signal to the drain lines DL are arranged. The video signal line output circuit DDR is constituted of an IC chip and a time division driving circuit TDC is provided between output lines (video signal line output) Y1, Y2, ... Y1 of the video signal line output circuit DDR and the drain lines DL for performing the time division driving of the drain lines DL.

Here, the number of time division is set to 3. Due to such a constitution, it is possible to reduce the number of output terminals of the IC chip of the video signal line output circuit DDR. The time division driving circuit TDC is integrally formed on the same substrate on which the thin film transistors of the pixel are formed by making use of polysilicon thin film transistors or the like, for example, thus forming a built-in circuit on the substrate. The gate line scanning circuit GDR may be formed of an IC chip or may be formed into one chip together with the video signal line output circuit DDR. Further, the gate line scanning circuit GDR may be constituted as a built-in circuit on the substrate in the same manner as the time division driving circuit TDC. These built-in circuits are also referred to as peripheral circuits.

On the periphery of the display region MXR, a common line drive circuit CDR which applies a common voltage to the common lines CL is arranged. Here, although the liquid crystal display device also includes a storage line drive circuit which applies a storage voltage to storage lines, the storage line drive circuit is not shown in the drawing.

Next, the time division driving is explained in further detail. The time division driving circuit TDC includes three switching elements (thin film transistors TFT) in parallel for every one output of the video signal line output circuit DDR. When clock signals CLK1, CLK2, CLK3 having phases which are different from each other are given to the control electrodes (gates) of the respective thin film transistors TFT, the time division driving circuit TDC divides one output of the video signal line output circuit DDR along a time axis and sequentially supplies the divided outputs to three drain lines DL in a time-division manner. Here, the number of time division may be suitably changed provided that the number is two or more.

Figure 2:
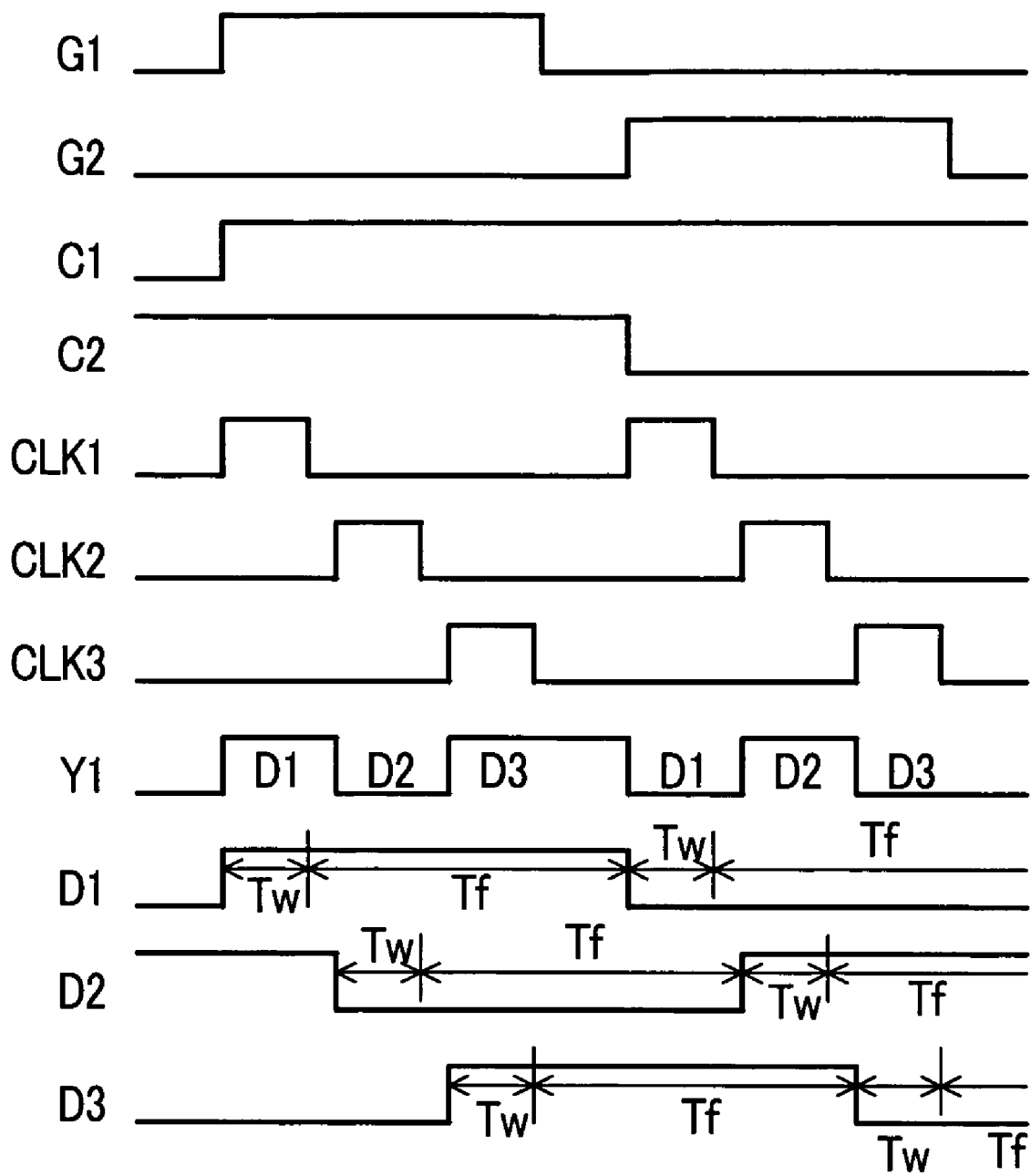
FIG. 2 is a timing chart for explaining the manner of operation of the time-division driving of the liquid crystal display device shown in FIG. 1.

FIG. 2 is a timing chart for explaining the manner of operation of the time division driving of the liquid crystal display device shown in FIG. 1. In FIG. 2, reference symbols equal to those in FIG. 1 correspond to waveforms of identical functional portions. Hereinafter, the operation of the constitution shown in FIG. 1 is explained in conjunction with FIG. 2. Here, the operation of the time division driving is explained with respect to the gate lines G1, G2 and drain lines D1, D2, D3 which correspond to the video signal line output Y1. However, the same goes for other gate lines and the drain lines.

The video signal output Y1 includes data (video signal) for the drain lines D1, D2, D3 and these data are outputted to the corresponding drain lines D1, D2, D3 in synchronism with the clock signals CLK1, CLK2, CLK3. Here, in FIG. 2, the data for these drain lines D1, D2, D3 are indicated as D1, D2, D3 which are equal to the reference symbols of the respective drain lines. That is, along with the fall of the clock signals CLK1, CLK2, CLK3, the data of the video signal line output Y1 is fetched into the drain lines D1, D2, D3. For example, with respect to the data D1, only the period in which the clock signal CLK1 is at the high level is set as the writing period Tw and the period in which the clock signal CLK1 is at the low level is set as the holding time Tf. This holding time Tf is a floating period. The same goes for the data D2 and data D3.

Due to such a constitution, it is possible to reduce the number of video signal line outputs to one third of the number of drain lines whereby the high reliability can be obtained due to the reduction of number of connection points and, at the same time, the manufacturing cost can be lowered due to the reduction of the drive circuit size. Here, as shown in FIG. 2, the common lines CL are provided independently for every horizontal line (corresponding to the horizontal scanning, gate line) and the respective common lines C1, C2, ... invert the polarities thereof for every one frame period. This inversion is sequentially performed for every one line during one horizontal period. In this manner, the common electrodes (or the common lines CL) are driven between two common voltages. Here, in this embodiment, although the common voltages are formed of two kinds of common voltages, when the optimum values differ due to various factors, three or more common voltages may be used in an adjustable manner.

Figure 3:
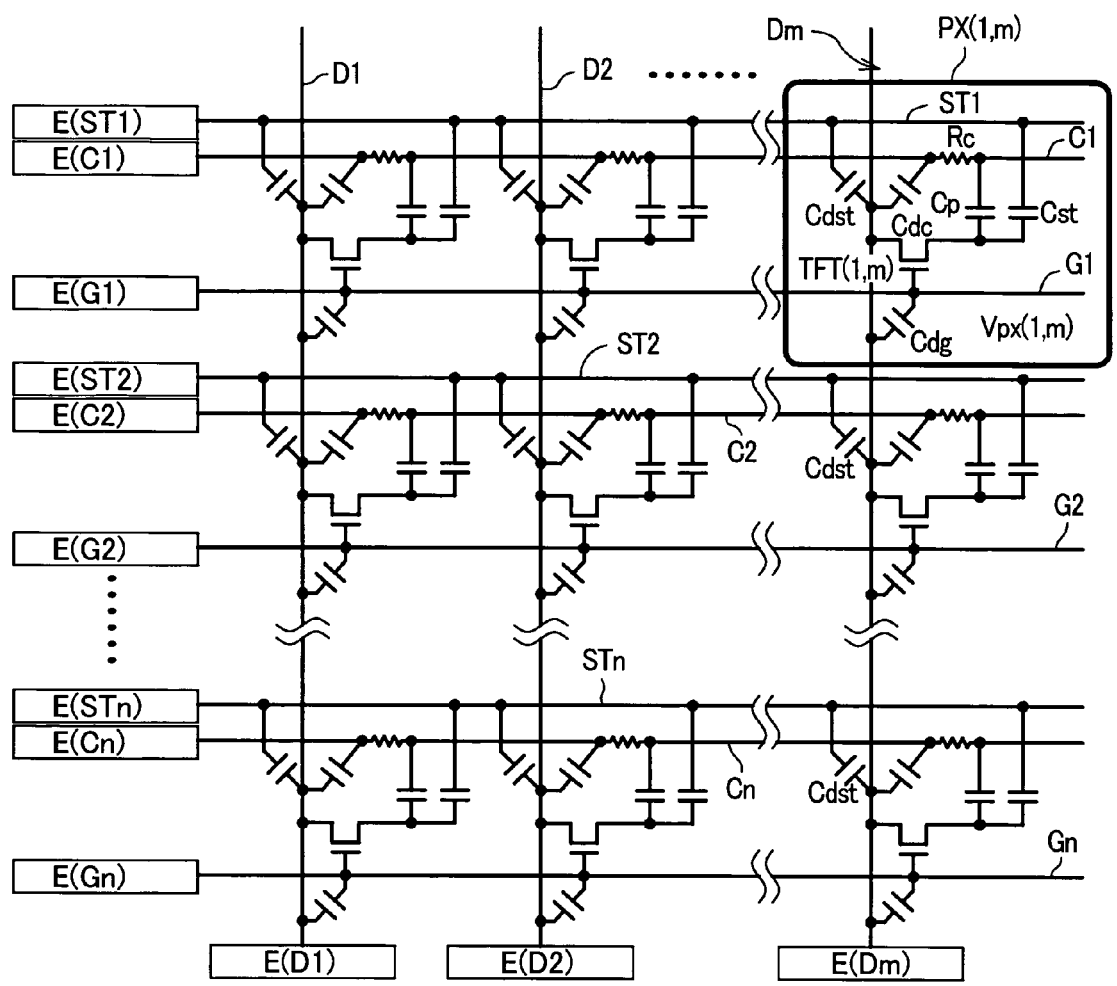
FIG. 3 is an equivalent circuit diagram for explaining the circuit constitution of a pixel portion in FIG. 1.
Figure 4:
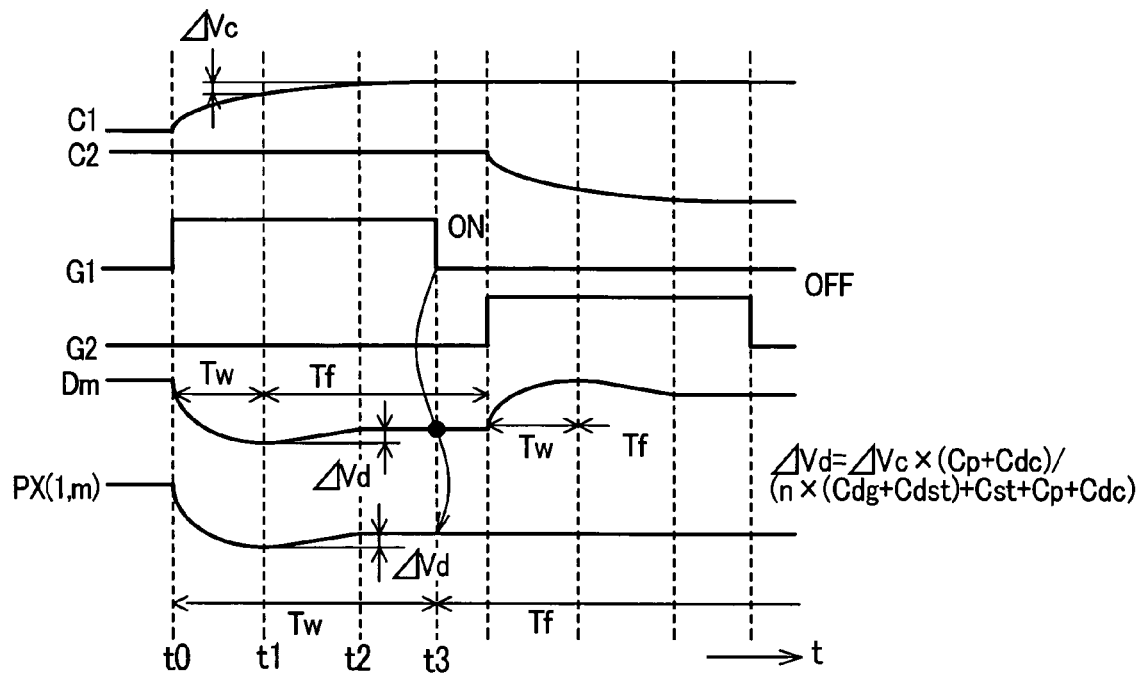
FIG. 4 is a timing chart for writing a potential to a pixel.

FIG. 3 is an equivalent circuit diagram for explaining the circuit constitution of a pixel portion in FIG. 1, that is, a portion of the display region MXR. Further, FIG. 4 is a timing chart for writing the potential to the pixel. In FIG. 3, reference symbols equal to those in FIG. 1 correspond to identical functional portions. The gate lines G1, G2, ... Gn are connected with the gate voltage sources E(G1), E(G2), ... E(Gn), and the common lines C1, C2, ... Cn are connected with the common voltage sources E(C1), E(C2), ... E(Cn), wherein these lines are independently driven. The storage lines STL (ST1, ST2, . . . STn) are connected with the storage voltage sources E (ST1), E(ST2), . . . E(STn). Further, the drain lines D1, D2, . . . Dm are connected with the drain voltage sources E(D1), E(D2), . . . E(Dm).

The constitution of the pixel circuit is explained by taking the pixel PX (1, m) as a representative example. The PX (1, m) includes the gate lines G1, the common lines C1 and the thin film transistor TFT (1, m) at an intersecting portion of the storage line ST1 and the drain line Dm. The capacitance related with the pixel PX (1, m) is constituted of a pixel electrode-common line capacitance Cp, a pixel electrode-storage line capacitance Cst, a drain line-common line capacitance Cdc, and a drain line-storage line capacitance Cdst.

Next, the manner of operation of the circuit shown in FIG. 3 is explained in conjunction with FIG. 4. Here, for the sake of easing the explanation, although the operation is performed reversely compared to the manner of operation of the timing chart shown in FIG. 2. That is, it is assumed that, in the time division driving circuit TDC, the clock signals are inputted sequentially in order of the clock signals CLK3, CLK2, CLK1 and the video signal is written sequentially in order of the drain lines Dm, Dm-1, Dm-2 in a time-division manner.

At a point of time t0 shown in FIG. 4, the supply of the video signal to the drain line Dm is started in response to the clock signal CLK3 not shown in the drawing (writing time Tw). Here, the gate line G1 assumes an ON level (ON) and the potential of the pixel PX (1, m) also follows the voltage of the drain line Dm. Further, for AC driving, the polarity of the potential of the common line C1 is also inverted and is gradually converged to a target value.

Next, at a point of time t1, the clock signal CLK3 is turned off and hence, the writing of the potential to the drain line Dm is completed and the drain line Dm assumes a floating state (a floating period Tf). Then, the clock signals CLK2, CLK1 are sequentially turned on and the writing of potential to the drain lines Dm-1, Dm-2 is sequentially performed. However, at the point of time t1, the common line C1 does not reach the target voltage by $\Delta Vc$. Thereafter, at a point of time t2, the common line C1 reaches the target voltage. At a point of time t3 which is a point of time at which the writing of potential to the drain line Dm-2 is finished, the gate line G1 assumes an OFF level (OFF) and the voltage of the drain line Dm is fetched as the pixel voltage of the pixel PX (1, m).

Since the gate line G1 assumes the ON level from the point of time t0 to the point of time t3, the thin film transistor TFT (1, m) is turned on and hence, as the voltage of the pixel PX (1, m), the target video signal voltage is written. However, during the period from the point of time t1 at which the drain line Dm assumes the floating state to the point of time t2 at which the common line reaches the target voltage, the voltage fluctuation $\Delta Vd$ of the drain line Dm is generated due to the capacitive coupling of the drain line Dm and the common line. This voltage fluctuation $\Delta Vd$ is given by a following formula. That is, assuming n as the number of horizontal lines, $$\Delta Vd = \Delta Vc \times (Cp+Cdc)/(n \times (Cdg+Cdst)+Cst+Cp+Cdc)$$

In the embodiment 1, by adding the capacitance between the drain line DL and the storage line STL which provides the fixed voltage, a denominator of the right-hand side of the above formula can be increased and hence, it is possible to set $\Delta Vd$ to an extremely small value compared to $\Delta Vc$. For example, by setting $\Delta Vd$ to several mV, it is possible to obtain the uniform and favorable video image having no inclination of brightness within the screen. Further, it is possible to form the additional capacitance between the drain line and the gate line while using the potential of the gate line as the fixed potential. Also in this case, it is possible to increase the denominator of the right-hand side.

In the present invention, the fixed potential is not always necessary to be completely fixed. That is, provided that the potential is fixed at least during the period in which the thin film transistor of the pixel is turned on, the object to reduce the voltage fluctuation $\Delta Vd$ during the period from the point of time t1 to the point of time t2 can be achieved. Accordingly, in this specification, the fixed potential is considered to as a concept which includes such a potential which is regarded as the fixed potential. Accordingly, the fixed potential may be the potential which is fluctuated as shown in the gate line GL. Further, the present invention is applicable not only to the case in which the potential of the storage line STL is always fixed but also to the case in which the potential of the storage line STL is changed in conformity with the AC driving.

Although the above-mentioned embodiment 1 is explained with respect to the case in which the common line is made of ITO, it is possible to further suppress the fluctuation of the pixel voltage by forming the common lines using a conductive material having the resistance lower than ITO. Further, the above-mentioned embodiment shows a case in which the present invention is applied to the IPS type liquid crystal display device. However, it is also possible to apply the present invention to the TN type liquid crystal display device so as to suppress the voltage fluctuation of the drain lines and the fluctuation of the pixel voltage.

In the foregoing explanation, the explanation has been made with respect to the fluctuation of potential of the pixel electrodes attributed to the fluctuation of the common electrodes (or common lines), even when the potential of the storage lines is fluctuated, the fluctuation of potential of the pixel electrode is generated due to the substantially equal principle. However, according to the constitution of the present invention, it is possible to reduce the influence attributed to the change of potential of the storage lines in the same manner.

Next, specific structural examples for forming the additional capacitance in the above-mentioned embodiment are explained. First of all, the pixel structure of the IPS type liquid crystal display device to which the present invention is applied is explained.

Figure 5:
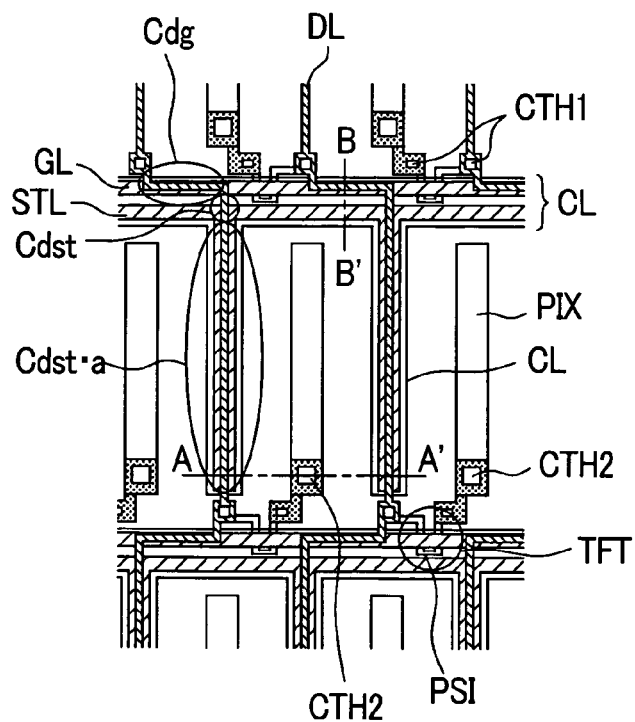
FIG. 5 is a plan view for explaining a layout of the pixel structure of an IPS type liquid crystal display device.
Figure 6:
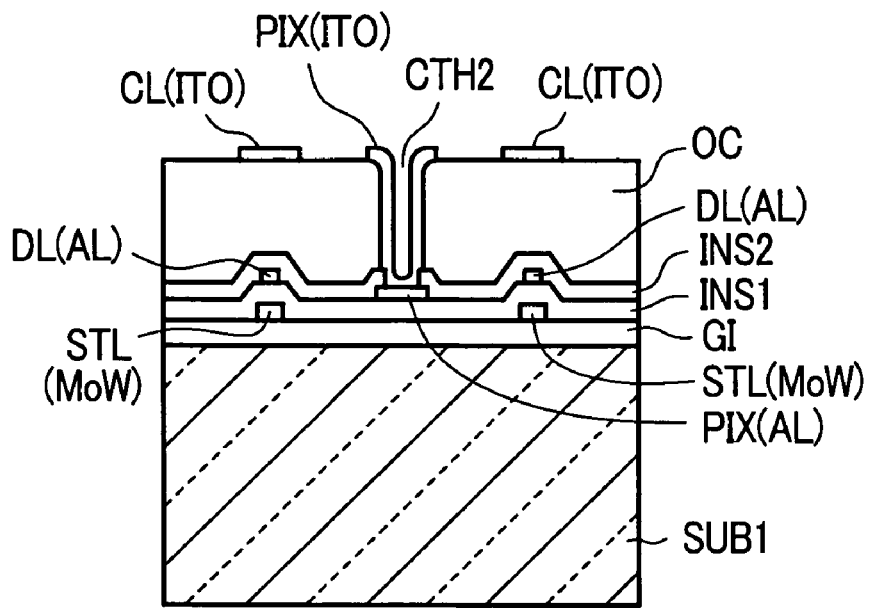
FIG. 6 is a cross-sectional view taken along a line A-A' in FIG. 5.
Figure 7:
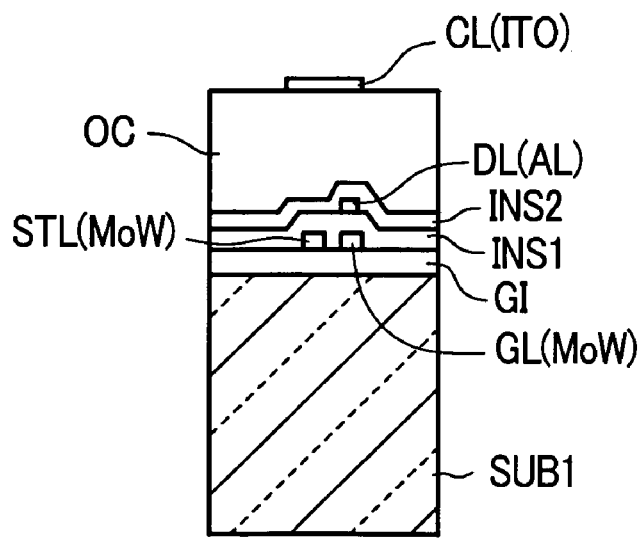
FIG. 7 is a cross-sectional view taken along a line B-B' in FIG. 5.

FIG. 5 is a plan view for explaining a layout of the pixel structure of the IPS type liquid crystal display device. Further, FIG. 6 is a cross-sectional view taken along a line A-A' in FIG. 5 and FIG. 7 is a cross-sectional view taken along a line B-B' in FIG. 5. With respect to the pixels of this liquid crystal display device, one pixel is formed in a region which is surrounded by the gate line GL, the storage line STL and the common line CL which extend in one direction and are arranged in parallel in another direction and the drain line DL which is formed so as to intersect these lines GL, STL, CL. Here, although pixels of the present invention are arranged in a delta array, this delta array is also included in the matrix array. Further, although the drain lines DL are arranged in a zigzag manner, this case is also expressed in this specification such that the drain lines DL extend in another direction and are arranged in parallel in one direction. Here, the common line CL has a portion which is branched and extends in another direction and this branched portion corresponds to the common electrode.

The pixel electrode which is constituted of an aluminum layer Al and an ITO layer is formed within the pixel region. In the drawing, Al, ITO, MoW and the like described in parentheses indicate constitutional materials. For example, the pixel electrode PIX is formed of PIX (AL) and PIX (ITO).

In FIG. 5 to FIG. 7, reference symbols which are equal to those in FIG. 1 and FIG. 3 correspond to identical functional parts. Further, symbols CTH1, CTH2 indicate contact holes, symbol SUB1 indicates a glass substrate, symbol G1 indicates a gate insulation film, symbols INS1, INS2 indicate interlayer insulation films, and symbol OC indicates a leveling film. The storage lines STL, the gate lines GL, the drain lines DL, the common lines CL, and the pixel electrodes PIX (PIX (Al), PIX(ITO)) are formed as the stacked structure shown in FIG. 6 and FIG. 7. Further, a thin film transistor TFT which adopts polysilicon PSI as an activation layer is formed in a portion of the pixel region, wherein the gate line GL is connected with a gate electrode thereof, the drain line DL is connected with a drain electrode (or a drain region) thereof, and the pixel electrode PIX (AL) is connected with a source electrode (or a source region) thereof.

In this embodiment, since the pixels are arranged in a delta array, a portion of the drain line DL which extends in the longitudinal direction in the drawing bumps into the pixel of next row and, thereafter, the portion of the drain line DL is pulled around in the lateral direction in the drawing by a half pitch of the pixel and the portion of the drain line DL is overlapped with the gate line GL (referred to as an intersecting portion). This portion unintentionally forms the capacitance Cdg. Further, since the storage line STL usually extends only in the lateral direction and is not branched and hence, a portion of the storage line STL which intersects with the drain line DL is extremely small and this intersecting portion unintentionally forms the capacitance Cdst. These capacitances Cdg, Cdst do not constitute the additional capacitance referred to in the present invention.

In the present invention, besides the capacitances Cdg, Cdst at the intersecting portions which are formed unintentionally, the additional capacitance Cdst·a is formed. To be more specific, the storage line STL which extends in the lateral direction is also branched (or extended) in the longitudinal direction so as to allow the storage line STL to be overlapped to the drain line DL, the additional capacitance Cdst·a is formed. This is the additional capacitance which is intentionally formed.

Figure 8:
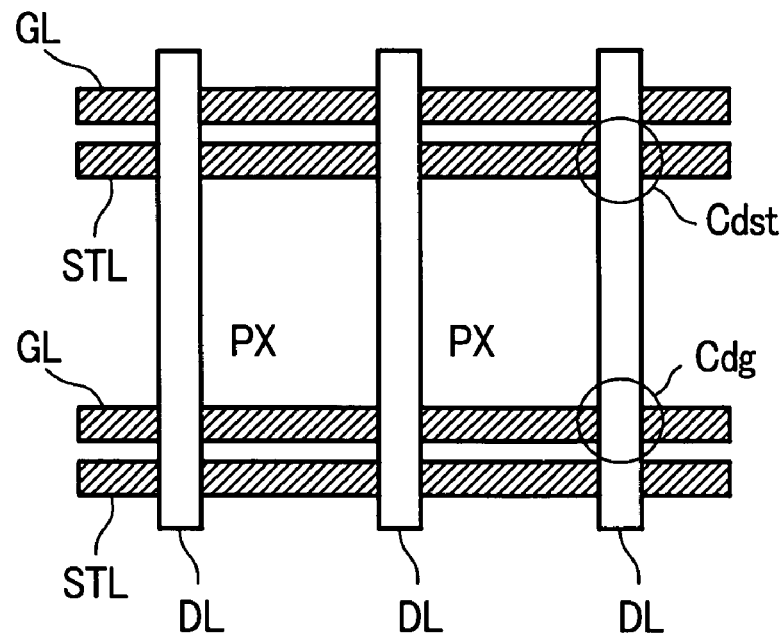
FIG. 8 is a plan view for explaining a layout of the conventional pixel structure for a comparison purpose.

Hereinafter, specific examples of the formation of additional capacitance according to the present invention are explained. These specific examples correspond to the modifications of the embodiment shown in FIG. 5. In the specific examples described hereinafter, to facilitate the understanding of these specific examples, only lines and the like which are necessary for the formation of the additional capacitance are shown and the detailed constitution of the pixel circuit is omitted. First of all, FIG. 8 is a plan view for explaining a layout of the conventional pixel structure illustrated for a comparison purpose. As shown in FIG. 8, only the drain line-gate line intersection capacitance Cdg and the drain line-storage line intersection capacitance Cdst are formed. That is, the drain line-gate line intersection capacitance Cdg is formed at an intersecting portion of the drain line DL and the gate line GL and the drain line-storage line intersection capacitance Cdst is formed at an intersecting portion of the drain line DL and the storage line STL. In this manner, the conventional pixel structure is not provided with the additional capacitance.

Figure 9:
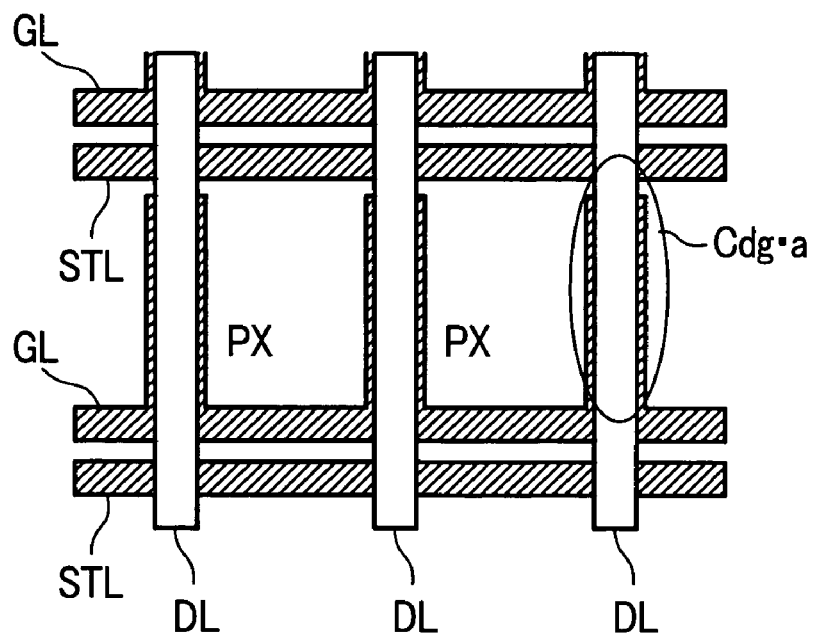
FIG. 9 is a plan view for explaining a first example of the layout of the pixel structure in which additional capacitance is formed according to the present invention.

FIG. 9 is a plan view for explaining a first example of the layout of the pixel structure in which the additional capacitance is formed according to the present invention. In this first example, in addition to the capacitances explained in FIG. 8, a portion of the gate line GL is allowed to extend along and below the drain line DL and the additional capacitance Cdg·a is formed between the extended portion of the gate line and the drain line.

Figure 10:
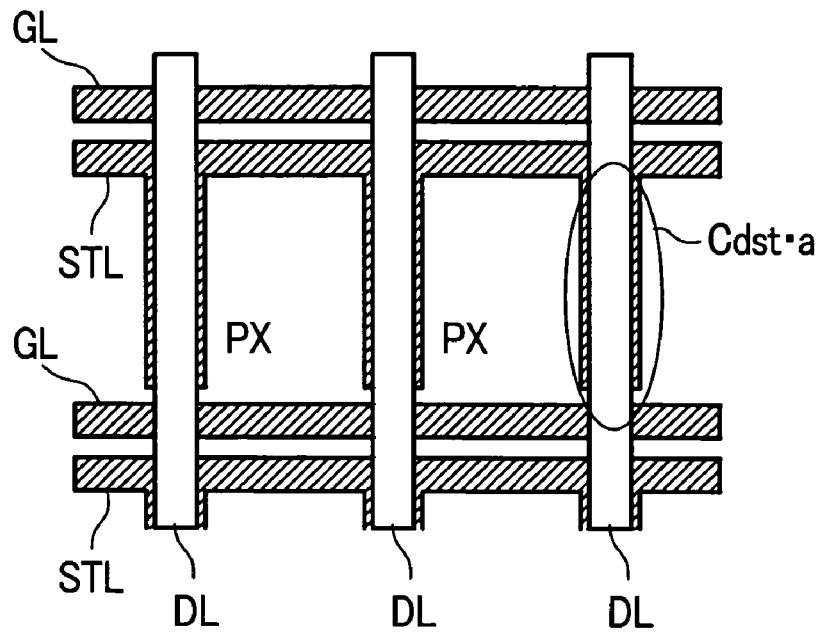
FIG. 10 is a plan view for explaining a second example of the layout of the pixel structure in which additional capacitance is formed according to the present invention.

FIG. 10 is a plan view for explaining a second example of the layout of the pixel structure in which the additional capacitance is formed according to the present invention. In this second example, a portion of the storage line STL is allowed to extend along and below the drain line DL and the additional capacitance Cdst·a is formed between the extended portion of the storage line and the drain line.

Figure 11:
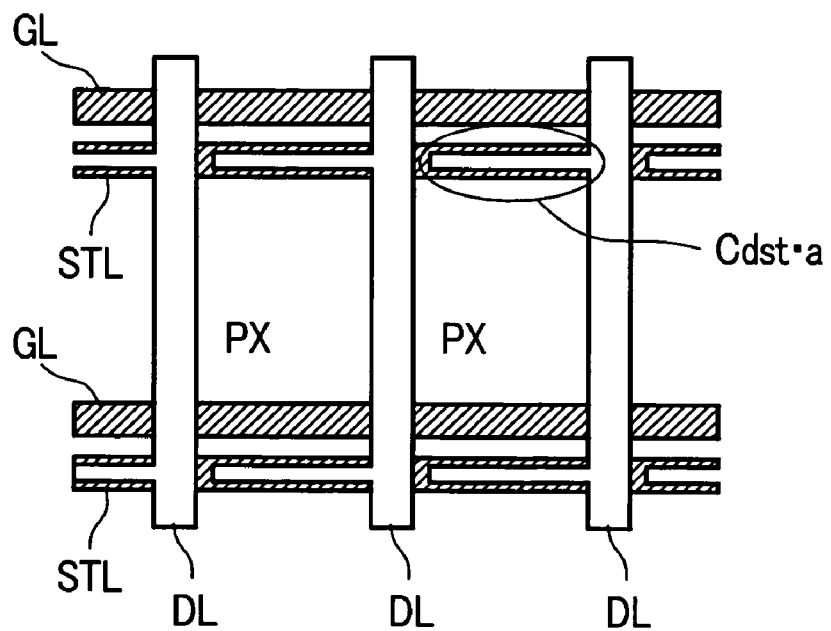
FIG. 11 is a plan view for explaining a third example of the layout of the pixel structure in which additional capacitance is formed according to the present invention.

FIG. 11 is a plan view for explaining a third example of the layout of the pixel structure in which the additional capacitance is formed according to the present invention. In this third example, a portion of the drain line DL is allowed to extend along and above the storage line STL and the additional capacitance Cdst·a is formed between the extended portion of the drain line and the storage line.

Figure 12:
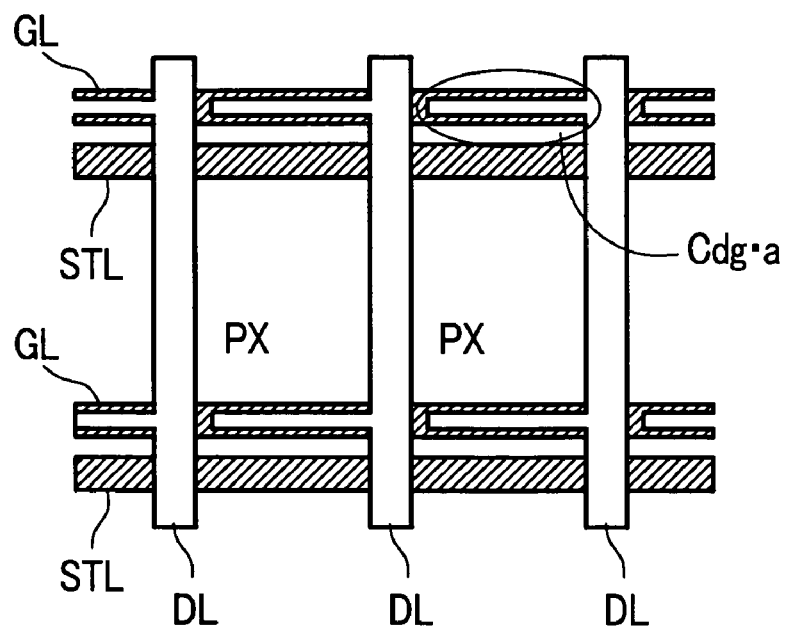
FIG. 12 is a plan view for explaining a fourth example of the layout of the pixel structure in which additional capacitance is formed according to the present invention.

FIG. 12 is a plan view for explaining a fourth example of the layout of the pixel structure in which the additional capacitance is formed according to the present invention. In this fourth example, a portion of the drain line DL is allowed to extend along and above the gate line GL and the additional capacitance Cdg·a is formed between the extended portion of the drain line and the gate line.

Figure 13:
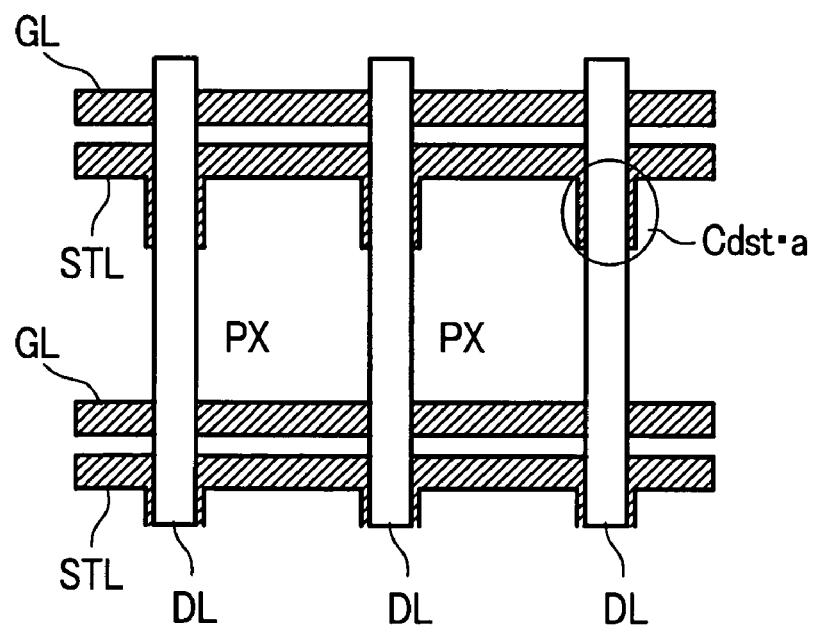
FIG. 13 is a plan view for explaining a fifth example of the layout of the pixel structure in which additional capacitance is formed according to the present invention.

FIG. 13 is a plan view for explaining a fifth example of the layout of the pixel structure in which the additional capacitance is formed according to the present invention. In this fifth example, a portion of the storage line STL is allowed to extend along and below the drain line DL and the additional capacitance Cdst·a is formed between the extended portion of the storage line and the drain line. Here, in this example, a width of the extended portion of the storage line STL is set larger than a width of the drain line DL. Further, the extended portion of the storage line does not extend over the whole area of the drain line DL and extends to a position corresponding to a portion there of and hence, the extended portion of the storage line STL has no function of blocking light from a backlight which passes through the pixel at a most portion of both side peripheries in the extending direction of the drain line DL.

Figure 14:
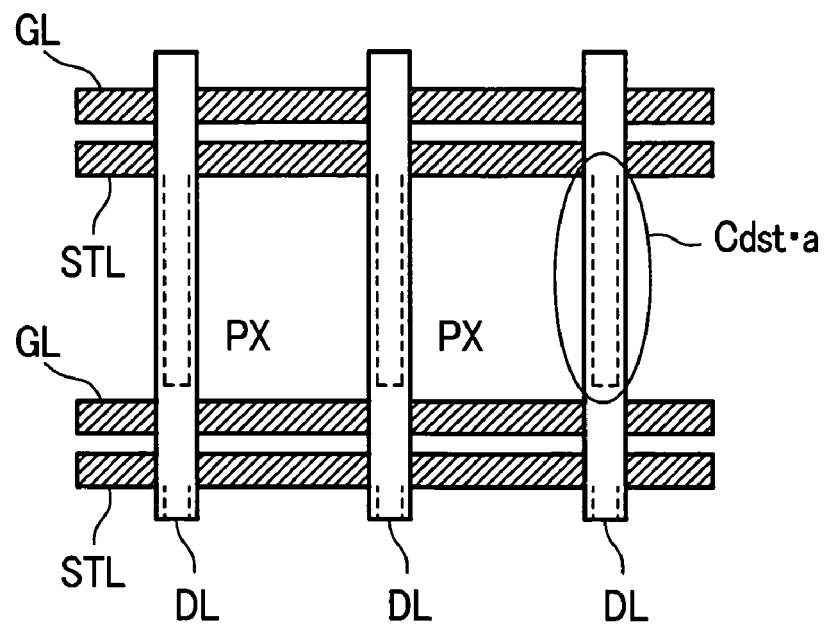
FIG. 14 is a plan view for explaining a sixth example of the layout of the pixel structure in which additional capacitance is formed according to the present invention.

FIG. 14 is a plan view for explaining a sixth example of the layout of the pixel structure in which the additional capacitance is formed according to the present invention. In this sixth example, a portion of the storage line STL is allowed to extend along and below the drain line DL and the additional capacitance Cdst·a is formed between the extended portion of the storage line and the drain line. Here, in this embodiment, a width of the extended portion is set smaller than a width of the drain line. Accordingly, the extended portion of the storage line has no function of blocking light from a backlight which passes through both side peripheries in the extending direction of the drain line DL.

Figure 15:
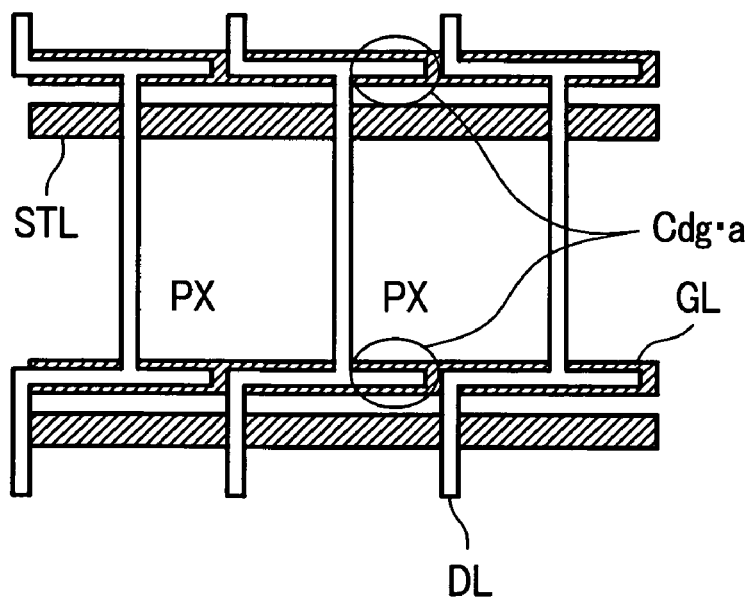
FIG. 15 is a plan view for explaining a seventh example of the layout of the pixel structure in which additional capacitance is formed according to the present invention.

FIG. 15 is a plan view for explaining a seventh example of the layout of the pixel structure in which the additional capacitance is formed according to the present invention. The pixels of this example are arranged in a staggered manner in the extending direction of the drain line DL (delta array). Then, a portion of the drain line DL which is bent for the staggered pixel arrangement on the gate line GL is further extended on the gate line GL and hence, the additional capacitance Cdg·a is formed between the extended portion of the drain line DL and the gate line GL.

Figure 16:
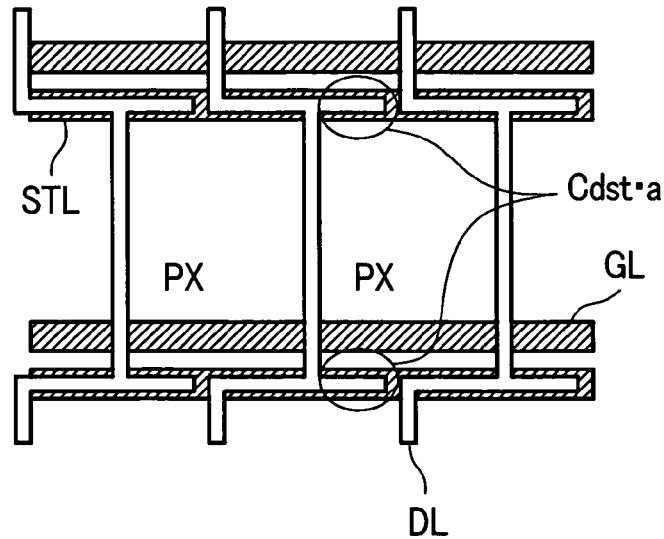
FIG. 16 is a plan view for explaining an eighth example of the layout of the pixel structure in which additional capacitance is formed according to the present invention.

FIG. 16 is a plan view for explaining an eighth example of the layout of the pixel structure in which the additional capacitance is formed according to the present invention. The pixels of this example are arranged in a staggered manner in the extending direction of the drain line DL (delta array).

Then, a portion of the drain line DL which is bent for the staggered pixel arrangement on the storage line STL is further extended on the storage line STL and hence, the additional capacitance Cdst·a is formed between the extended portion of the drain line DL and the storage line STL.

Figure 17:
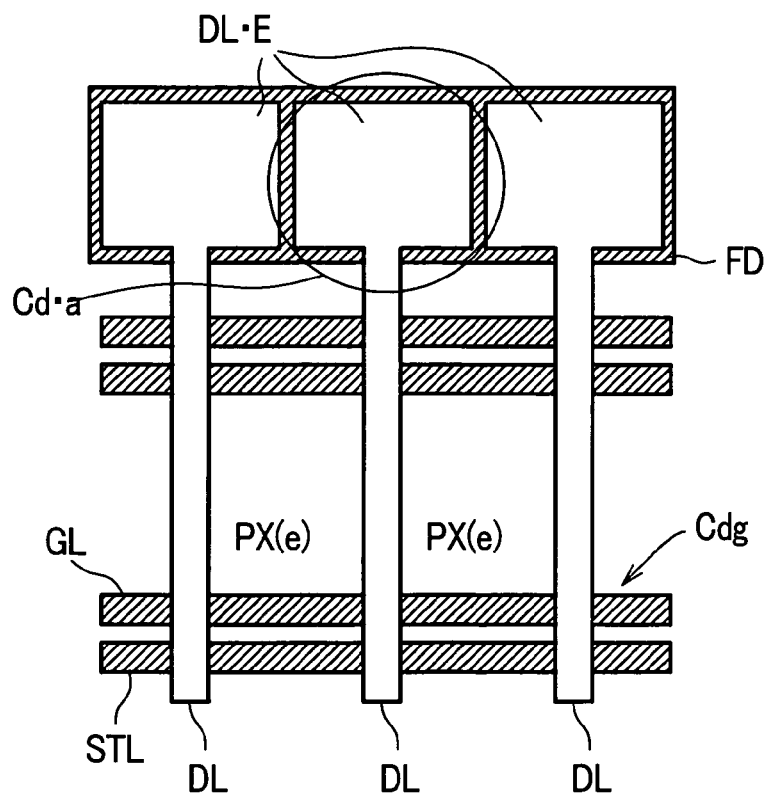
FIG. 17 is a plan view for explaining a ninth example of the layout of the pixel structure in which additional capacitance is formed according to the present invention.

FIG. 17 is a plan view for explaining a ninth example of the layout of the pixel structure in which the additional capacitance is formed according to the present invention. This example is characterized by forming the additional capacitance outside the display region. That is, a capacitance forming portion DL·E is formed on an end portion of the drain line DL which is arranged outside the display region. Reference symbol PX (e) indicates the pixel at an end portion of the display region. The capacitance forming portion DL·E forms the additional capacitance Cd·a by interposing an insulation layer such as an interlayer insulation film or the like between an electrode FD which has the potential of the storage line, the gate potential or other suitable fixed potential and the capacitance forming portion DL·E. Here, as has been explained in conjunction with FIG. 5 to FIG. 16, when the additional capacitance is formed within the display region, the number of horizontal lines, that is, n pieces of additional capacitances can be formed and hence, even when the individual capacitance is small, capacitance can be increased by n times. However, when the additional capacitance is formed outside the display region as shown in FIG. 17, it is necessary to form the slightly larger capacitance.

By adopting the constitution of the respective examples explained heretofore, the fluctuation of the pixel voltage can be suppressed and hence, it is possible to obtain the high quality display.

Here, the examples which have been explained in conjunction with FIG. 5 to FIG. 17 may be applied in combination of two or more examples provided that no contradiction arises between or among these embodiments. Further, the manner of stacking the respective lines in order in the vertical direction is not limited to the manner of stacking shown in the drawings and can be suitably changed.

Further, although the case in which common electrodes are independently driven for every one line using the common lines CL in the embodiments explained heretofore, the common electrodes may be driven in common with respect to respective pixels. Further, it may be possible to form the common electrode in common over the substantially whole area of the counter substrate without using the common lines CL.

Further, the common electrodes may be independently driven for every pixel. For example, in the IPS type liquid crystal display device, the second thin film transistor may be provided in the inside of the pixel and the common potential is written in the common electrode via the second thin film transistor. In this case, the common line CL may be formed along the extending direction of the drain line.

Further, the potential of the storage line may be fixed or may be driven between at least two storage voltages.

What is claimed is:

1. A liquid crystal display device comprising:
    a pair of substrates which sandwich liquid crystal therebetween;
    a plurality of gate lines which extend in one direction and are arranged in parallel with one another;
    a plurality of drain lines which extend in another direction and are arranged in parallel with one another, said another direction intersects said one direction;
    a plurality of common lines which extend in said one direction and are arranged in parallel with one another;
    a plurality of storage lines which extend in said one direction and are arranged in parallel in said another direction;
    a plurality of pixels which are arranged in a matrix array corresponding to intersecting portions of the gate lines and the drain lines,
    wherein each of said pixels is defined by a pair of said gate lines and a pair of said drain lines, said each pixel has one of said storage lines formed under one of said drain lines with an insulating film therebetween, and
    said storage line is formed under one of said common lines with a plurality of insulating film therebetween.

2. A liquid crystal display device according to claim 1, wherein a pair of neighboring common lines in a direction across said gate line are separated.

3. A liquid crystal display device according to claim 2, wherein nearest common lines in a direction across said gate line are separated.

4. A liquid crystal display device according to claim 3, wherein said storage line is wider than a nearest drain line and narrower than said common line.

5. A liquid crystal display device according to claim 4, wherein said common line is wider than a total width of said storage line, a nearest gate line and a gap between said storage line and said nearest gate line.

6. A liquid crystal display device according to claim 1, wherein said storage line is wider than a nearest drain line and narrower than said common line.

7. A liquid crystal display device according to claim 6, wherein said common line is wider than a total width of said storage line, a nearest gate line and a gap between said storage line and said nearest gate line.

8. A liquid crystal display device according to claim 1, wherein said common line is wider than a total width of said storage line, a nearest gate line and a gap between said storage line and said nearest gate line.

* * * * *

UNITED STATES PATENT AND TRADEMARK OFFICE
CERTIFICATE OF CORRECTION

| | |
|---|---|
| PATENT NO. | : 7,619,693 B2 |
| APPLICATION NO. | : 11/003535 |
| DATED | : November 17, 2009 |
| INVENTOR(S) | : Fujioka et al. |

Page 1 of 1

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 657 days.

Signed and Sealed this

Twenty-sixth Day of October, 2010

David J. Kappos
*Director of the United States Patent and Trademark Office*